3,331,793
ABRASION RESISTANT VULCANIZATES COMPRISING EPD RUBBER, CARBON BLACK, AND MINOR AMOUNTS OF NATURAL RUBBER OR SBR
Robert David Souffie, Wilmington, Del., assignor to E. I. du Pont de Nemours and Company, Wilmington, Del., a corporation of Delaware
No Drawing. Filed May 25, 1964, Ser. No. 370,105
4 Claims. (Cl. 260—4)

This invention relates to α-olefin copolymer elastomers and, more particularly, to improving the abrasion resistance of their sulfur-cured vulcanizates.

Sulfur-curable α-olefin hydrocarbon copolymer compositions loaded with carbon black are of growing commercial importance today for making an increasing variety of useful articles. In order to obtain broader commercial acceptance for some applications, such as tire tread stock, the vulcanizates of these compositions need improved abrasion resistance. While certain techniques to accomplish this have been devised, they have not yielded a gain in abrasion resistance without some sacrifice in the order excellent properties of the vulcanizates.

It has unexpectedly been found that the abrasion resistance of sulfur-cured vulcanizates of highly-sheared, black-loaded chain-saturated α-olefin hydrocarbon copolymers can be greatly improved by the incorporation therein, before curing of a minor amount of styrene-butadiene rubber or cis-polyisoprene rubber without a sacrifice in the other desirable vulcanizate properties. Improvements in abrasion resistance (as measured by NBS abrasion index values) have been obtained as high as three times that displayed by vulcanizates of the same composition containing no additive rubber.

The amount of "additive rubber," i.e., the styrene-butadiene rubber (SBR) or cis-polyisoprene, to be added should be the minimum quantity effective to produce an improvement in abrasion resistance. Unduly large concentrations lead to a decrease in the modulus and the development of poor heat build-up characteristics. The present invention includes within its scope any amount, in a minor proportion, which improves the abrasion resistance of the copolymer-carbon black composition without adverse effect upon the residual properties. Typically, the additive rubber is added in amounts less than about 3 parts per 100 parts by weight of α-olefin hydrocarbon copolymer. When about 1 to 2 parts of additive rubber are used truly extraordinary improvements in abrasion resistance can be obtained.

For any given amount of additive rubber, there is an optimum amount of sulfur for achieving an outstanding improvement in the abrasion index value. If the abrasion index values are plotted as a function of the amount of sulfur added for a constant concentration of additive rubber, the resulting curve frequently describes a sharp maximum; if more or less sulfur than the optimum amount is employed, only a slight improvement in the abrasion index value will result. The amount of sulfur needed for optimum results can easily be determined by routine experiments in which the amount of additive rubber is maintained constant and the amount of sulfur is varied.

The additive rubber compositions include styrene-butadiene rubber (SBR), natural rubber (e.g., smoked sheet) and polyisoprenes similar to natural rubber. The particularly preferred compositions have about 14 to 15 sulfur-curable carbon-carbon double bonds per kilogram.

The synthetic rubber referred to here as "SBR" contains both butadiene monomer units and styrene units; styrene-butadiene copolymers containing about 96–57% diene units by weight (corresponding to 17.8–10.55 sulfur-curable C=C/kilo) are known in the art. A particularly preferred SBR incorporates about 76.5% butadiene units by weight (corresponding to about 14.2 sulfur-curable carbon-carbon groups/kilogram) and exhibits an intrinsic viscosity in toluene of about 2.09 which corresponds to a viscosity-average molecular weight of about 270,000. The Mooney viscosity of raw uncompounded polymer read after 4 minutes operation of the large rotor at 100° C. ranges between about 46 to 54. Styrene-butadiene copolymers containing more or less butadiene than this preferred embodiment can be used too.

The polyisoprenes are largely made up of 1,4-monomer units of which a high proportion (at least about 90%) are cis. Such polymers have about 14.7 C=C/kilo. The preparation of these polymers is described more particularly in U.S. Patents 2,849,391, 2,856,391, 2,979,494, 2,908,672, 2,908,673, 2,913,444, and 2,977,349.

The chain-saturated α-olefin copolymers employed in the present invention are those characterized by having a saturated main chain but having sufficient side-chain, aliphatic or cycloaliphatic unsaturation to make them sulfur-curable. The copolymers of at least one α-monoolefin and at least one non-conjugated hydrocarbon diene are suitable. The α-monoolefins have the structure $CH_2=CHR$ where R is hydrogen or $C_1-C_{16}$ alkyl. It is preferred that these copolymers contain about 20–75% by weight ethylene monomer units and that the other α-monoolefins be straight-chained. The representative dienes include $C_5-C_{22}$ open-chain compounds of the formula

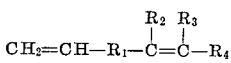

wherein $R_1$ is an alkylene radical and $R_2$, $R_3$ and $R_4$ are independently selected from the group consisting of hydrogen and alkyl radicals; $R_4$ is preferably alkyl. Representative cyclic non-conjugated dienes include: dicyclopentadiene; 5-alkenyl-2-norbornenes; 5-methylene-2-norbornene; 2-alkyl-2,5-norbornadienes; cyclopentadiene; and 1,5-cyclooctadiene.

Representative examples of copolymers made from these α-monoolefins and the above-described non-conjugated dienes and their preparation are given in U.S. Patents 2,933,480; 3,000,866; 3,063,973; 3,093,620; and 3,093,621. When cyclic non-conjugated dienes are employed, it is preferred that the reaction mixture contain ethylene and at least one other α-monoolefin.

The preferred representative copolymers include: ethylene/1,4-hexadiene; ethylene/propylene/1,4-hexadiene; ethylene/propylene/dicyclopentadiene; ethylene/propylene/5-methylene-2-norbornene; ethylene/propylene/2-ethyl-2,5-norbornadiene; ethylene/propylene/cyclopentadiene; and ethylene/propylene/1,5-cyclooctadiene.

The highly-sheared stock containing the chain-saturated α-olefin hydrocarbon copolymer and the carbon black may contain minor amounts of other reagents provided they do not interfere with the attainment of the desired results. Thus, small amounts of antioxidant (such as are usually present in the copolymer being treated), tackifiers, mold release agents such as stearic acid, and oxides such as zinc oxide can be present. It is essential that the customarily employed heat-treatment promoters, e.g., p-quinone dioxime ("GMF"), be absent during the shear-treatment of the polymer-filler mixture. If heat-treatment promoters are present, gel is formed leading to an undesirable increase in the viscosity of the stock being masticated. The exceptional improvement in vulcanizate behavior displayed by the final composition of the present invention will not be observed if excess oil is present during the mastication of the copolymer-carbon black mixture. Preferably oil is absent, but smaller amounts, for example 15 parts per 100 parts by weight of copolymer, can be present to aid mixing of heavily loaded stocks. For given shear conditions, and a given copolymer-carbon black combination, as the amount of oil is increased the improvements obtained will decrease.

The requirement that the black-loaded $\alpha$-olefin hydrocarbon copolymer stock be highly sheared is quite critical. If conventional black stocks are used in place of the highly-sheared stock a great improvement in abrasion resistance cannot be obtained without a consequent deterioration in modulus and heat build-up properties.

It is critically important that the black-loaded composition just described be subjected to shearing mastication at a temperature of at least about 200° F. The amount of shear required will depend, in part, on such factors as the temperature and time of shearing. For example, a loaded stock heated to a temperature of 275° F. requires less shear than when the loaded stock temperature is sheared at a starting temperature of about 200° F. and vice versa. The amount of shear to which a loaded copolymer stock is subjected in a given period of time can be varied by varying the shear rate. Thus, increasing the rate of shear at the lower masticating temperature of 200° F. yields a stock having similarly improved properties as the loaded copolymer stock sheared at the lower relative rate and at the higher temperature.

It is well recognized by those skilled in the art that the amount of shear performed on a given stock will depend, in addition to the speed at which the mixer is operated, on such factors as the size of the mixer, the clearances between mixing surfaces, and mixer efficiency. Generally, the larger the size of a particular type of mixer, the greater the rate of shear for the same rotor speed. Accordingly, a suitably sheared stock will be obtained on a larger size mixer more quickly than a smaller size mixer of the same type, all operating variables being essentially the same. The smaller are the clearances between mixing surfaces, the greater is the amount of shear or shearing efficiency for given rotor speed for a particular mixer and size thereof.

The shearing efficiency of a particular mill or mixer can be considered the relative amount of copolymer stock being sheared at a particular instant. Internal mixers by construction provide more efficient shearing than open type mixers and, consequently, it is preferred to utilize constant shearing but this procedure is not necessary. Some examples of internal mixers include the Banbury and Struthers-Wells mixers and the Brabender plastograph. Although mixers such as these provide the most efficient shearing, it is to be understood that the degree of shearing in any given instant varies throughout the stock being masticated. A rubber roll mill is an example of the less efficient and therefore less desired open type mixer.

In a representative mixing operation, a Struthers-Wells mixer is operated at 58 r.p.m. when the masterbatch temperature is about 200° F. It has been found that insufficient improvement in the properties of the final composition occurs when a lower rate of shear, for example 38 r.p.m., is applied. On the other hand, when the chamber temperature of the mixer is 275° F., the Struthers-Wells mixer can be operated at as low as 38 r.p.m. to produce a satisfactory stock.

It is not necessary that the mixture be heated to 200° F. before the shearing is commenced. Thus, the copolymer-carbon black mixture can be prepared at a lower temperature, such as 110° F., and then subjected to shear at temperatures above 200° F.

In order to get the most efficient shearing with the preferred type of mixer, the internal mixer, its mixing chamber should be filled with as much stock to be masticated as possible. The relative proportions of copolymer and carbon black might be determinative of the optimum degree to which the mixer should be loaded. For example, it has been found that the more extensive the carbon black loading, the more full the mixer should be to obtain best shearin gefficiency. Thus, a Struthers-Wells mixer can be about ½ of operating capacity when 72 parts per hundred of high abrasion furnace black are employed for every 100 parts by weight of copolymer having a Mooney viscosity (ML–4/212° F.) of about 90. On the other hand, the mixer should be about filled to capacity when 120 parts per hundred of this carbon black are introduced. It can be seen from these illustrative results that stocks heavily loaded with carbon black should be treated in an internal mixer rather than on a rubber roll mill.

It is thus apparent that once the minimum temperature of about 200° F. is met, the amount of shear required to obtain a suitable stock of the essential ingredients hereinbefore described is dependent on many factors. Techniques such as increasing the rate of shear (as compared to conventional mixing speeds), mixer loading, and batch temperature above 200° F. can be employed separately or in combination to obtain a stock which is suitable for further processing according to the present invention. By adjusting these variables for a given black loaded copolymer, the stock to which the additive rubber is added, is obtained. As a general guide, the visual appearance of the stock is helpful; for example, the better the apparent degree of carbon black dispersion, the better the stock.

The shear required for the copolymer-carbon black composition can also be described in terms of the amount of shear required to produce a certain effect on a standard copolymer carbon black mixture. For example, it has been found that suitably sheared stocks are obtained when the shear temperature is at least about 200° F. and shearing process is sufficient to produce a decrease of at least about 5% in the minimum point value of the Mooney scorch curve (measured at 250° F.) of a composition consisting of 100 parts by weight of the copolymer 52% ethylene, 44% propylene, and 4% 1,4-hexadiene, all percents being by weight having a Mooney viscosity (ML–4/250° F.) of about 70 and about 70 to 80 parts by weight of high abrasion furnace black (HAF) per 100 parts by weight of said copolymer. Once the time, temperature, and shear ratio for a particular mixer have been adjusted so that the standard mixture undergoes the proper decrease in Mooney scorch minimum, mixtures of other copolymers within the named class and carbon black can be made essentially the same way in this equipment and such mixtures can be mixed with the additive rubber to obtain a product which is sulfur-curable to a vulcanizate having outstanding abrasion resistance. If the decrease in the Mooney scorch minimum for the standard is less than about 5%, the full development of the vulcanizate properties will not be obtained, e.g., lower moduli and poorer resistance to abrasion will be noted than if the stock is made in accordance with this invention. Optionally, the Mooney minimum can be decreased more than 20%; although such a degree of viscosity reduction can be advantageous for processing convenience, it is not necessary for the preparation of the highly-sheared stock or final compositions of this invention. Those skilled in the art can adjust the time, temperature and the shear rate in routine experiments to attain the best stock.

The carbon black can be added to the $\alpha$-olefin hydrocarbon copolymer during or prior to high-temperature shearing by any means familiar to those skilled in the art. Thus, the carbon black can be added to the solid polymer with the aid of conventional rubber rolls or Banbury mixers. Alternatively, the carbon black can be introduced into a latex which is subsequently coagulated or drum dried. Furthermore, the carbon black can be introduced into a copolymer solution which is subsequently concentrated, e.g., by evaporative distillation or drum drying.

In the black-loaded stock at least 10 parts, frequently 20–160 parts of carbon black, are supplied for each 100 parts by weight of the α-olefin copolymer. The general improvement in vulcanizate properties of the stock, relative to those of conventional stocks having the same amount of black and curing agents, becomes more pronounced as the carbon black loading is increased. Stocks having less than 10 parts of carbon black will display some improvement but the effect will sometimes be too small to be of interest for most purposes. The upper limit of carbon black loading will depend upon the mixing equipment on hand and the end use for the particular stock. Stocks containing high black loading, for example 160 parts per hundred, are not mixed as easily as those having a lower black content. It is to be understood that the point of the present invention is the use of the additive rubber to improve the quality of the vulcanizate of the black-loaded stock; the improvement will be observed whether a large or a small amount of carbon black is present but the over-all vulcanizate properties will be better if the loading is carried out in accordance with the preceding recommendations.

The reinforcing furnace and channel process carbon blacks are preferred. Representative examples of reinforcing blacks include SAF, HAF, and ISAF carbon blacks, particularly the high-structure types. Other furnace blacks such as SRF, HMF, CF, and FF can also be used satisfactorily. Typical channel blacks include EPC, MPC, HPC, and CC. Stocks containing channel black are slightly slower curing. Thermal carbon blacks are suitable but provide a lower order of reinforcement than given by furnace or channel blacks.

It is to be understood that after the black-loaded stock has been prepared under the critically specified shearing conditions, it can be further loaded. However, this optional step will often only be done when the stock is being very heavily loaded.

The compositions of the present invention are cured with a sulfur curing system which includes sulfur itself, a metal oxide such as zinc oxide, and curing accelerators. As mentioned above, it is particularly important to determine the optimum amount of sulfur to use in a particular stock by routine experimentation. If too little sulfur is supplied, the stocks will not cure. On the other hand, if too much sulfur is provided, the stress-strain and heat build-up properties may suffer. It is best to make up a series of compositions containing increasing amounts of sulfur and having a constant proportion of the additive rubber to determine the amount of sulfur "equivalent" to the amount of additive rubber. Comparison of vulcanizate properties will readily allow one skilled in the art to select the range of sulfur concentrations most useful for obtaining the increased abrasion index values desired while retaining the desirable stress-strain and heat build-up properties which can be obtained in the absence of the additive rubber. Typically, about 0.75–1.5 parts of sulfur are added for every 100 parts by weight of the α-olefin hydrocarbon copolymer.

About 5 parts of zinc oxide are preferred although it is to be understood that higher or lower concentrations can be employed. The concentration of the metal oxide is important since it, in conjunction with sulfur and accelerator, controls the ultimate state of cure. The most active accelerators include 2-mercaptobenzothiazole, thiuram sulfides, dithiocarbamates, and very similar derivatives. The thiuram sulfides and the dithiocarbamates are generally preferred because they produce rapid curing without attendant scorching and develop and maintain maximum physical properties even on extended curing cycles. Alternatively, however, 2-mercaptobenzothiazole and its derivatives, alone or in combination with thiurams and dithiocarbamates provide adequate acceleration with processing safety. Representative accelerators include: tetramethylthiuram monosulfide; tetramethyl thiuram disulfide; tellurium diethyldithiocarbamate; the zinc salt of dimethyl dithiocarbamic acid; the piperidine salt of pentamethylene-dithiocarbamic acid; 2 - mercaptothiazoline; 2 - mercaptobenzothiazole; N,N - diethylthiocarbamyl-2-mercaptobenzothiazole; and 2,2′-dithiobisbenzothiazole. Those skilled in the art can select by routine empirical experiments the best combinations of accelerators when curing a particular assembly. In addition to the above-described components, the novel composition may include such optional components as conventional antioxidants. Various procedures and modifications of sulfur curing are more particularly described in Encyclopedia of Chemical Technology, Kirk and Othmer, published by Interscience Encyclopedia, Inc., New York, 1953, vol. 11, pages 892–927; Principles of High-Polymer Theory and Practice, Schmidt and Marlies, published by McGraw-Hill Book Co., New York, 1948, pages 556–566; Chemistry and Technology of Rubber, edited by M. Morton, Reinhold Publishing Corp., New York, 1959, pages 93–129; The Applied Science of Rubber, edited by W. J. S. Naunton, Edward Arnold Ltd., London, 1961, pages 346–413, 992–1099.

After the stock has been prepared by the special high shear mixing described above, it can be stored indefinitely or it can be compounded with the other ingredients desired and cured. It is critically important to avoid adding the additive rubber during the preparation of the highly-sheared black loaded stock. The ultimate vulcanizate properties will be markedly inferior otherwise. The additive rubber can be introduced into the black loaded stock in any conventional manner such as on a rubber roll mill or in a Banbury mixer, caution being observed to avoid high-shear mixing at the critical temperatures needed for preparing the stock itself. The composition of the present invention containing the additive rubber can be stored indefinitely or it can be immediately compounded with other ingredients including sulfur and cured. The order in which the stock is compounded is not critical; thus, the additive rubber can be added at any time prior to the commencement of cure. The compounding can be carried out in accordance with a need for the particular application. Thus, the stock can be pigmented or it can be mixed with other agents such as petroleum oils. It is to be understood that mixtures of two or more stocks of the present invention can be blended together and compounded with curing agents or separately compounded with curing agents and then blended, or further variations can be carried out in accordance with the needs of a particular application.

Vulcanization is accomplished by heating the compounded stock (often in a mold) at a temperature of about 130° C. (266° F.) to about 180° C. (356° F.) for a period ranging from about 5 minutes to several hours; it is often preferred to cure the stock at 160° C. (320° F.) for about 15 to 20 minutes. Steam cures can be employed as well. Representative pressures can range from about 60–225 p.s.i. steam and representative times can range from about 30 seconds to 30 minutes. A typical steam cure is about 30 seconds at 225 p.s.i. steam pressure. The state of cure is often best determined by the value of the extension modulus at 300% elongation.

The final compositions of the present invention can be fabricated into products such as tire tread stock by rubber processing procedures known in the art and then cured as just explained.

The invention will now be described with reference to the following examples of specific embodiments thereof wherein parts and percentages are by weight unless otherwise specified. The test procedure employed in the examples are identified in the following list:

| | ASTM procedure employed |
|---|---|
| Extension modulus | D412–61T. |
| Shore A hardness | D676–59T (constant load stand). |
| NBS abrasion index | D1630–61. |
| Heat build-up: ΔT external, ΔC+ [1] | D623–58 Method A (⅜″ stroke, 30-lb. load, frequency 1800 r.p.m.). |
| Mooney scorch | D1646–61. |

[1] +ΔC=final compression minus minimum compression.

Example 1

An ethylene/propylene/1,4-hexadiene copolymer (EPH) is prepared in tetrachloroethylene in the presence of a diisobutyl aluminum chloride/vanadium oxytrichloride catalyst according to the general procedures set out in U.S. Patent 2,933,480. It has the following approximate monomer unit composition (by weight): ethylene, 52%; propylene, 44%; 1-4-hexadiene, 4%. The Mooney viscosity (ML–4/250° F.) is about 70.

A styrene/butadiene rubber (SBR–1500) is selected having the following monomer unit composition by weight: 76.5% butadiene and 23.5% styrene. It exhibits an intrinsic viscosity in toluene of about 2.09 corresponding to a viscosity-average molecular weight of about 270,000, its transition temperature is about −62° C., its density at 25° C. is about 0.93 gram per cubic centimeter and the Mooney viscosity of the raw uncompounded copolymer right after 4 minutes' operation of the larger rotor at 100° C. ranges between about 46 to 54.

To prepare the highly-sheared, black-loaded stock a Struthers-Wells mixer at a chamber temperature of 250° F. is loaded with 876 grams of the ethylene/propylene/1,4-hexadiene copolymer and 631 grams of high abrasion furnace black and subsequently run at 76 r.p.m. for 10 minutes; the final chamber and stock temperatures are about 380 and 360° F., respectively. The stock thus prepared has the following composition:

| Component: | Parts |
|---|---|
| Copolymer (EPH) | 100 |
| HAF carbon black | 72 |

The black-loaded stock is compounded on a rubber roll mill at 75–100° F. according to the following recipe:

| Component: | Parts |
|---|---|
| Highly-sheared, black-loaded stock | 172 |
| SBR | 1 |
| Zinc oxide | 5 |
| Stearic acid | 1 |
| Naphthenic petroleum oil | 40 |
| Tetramethyl thiuram monosulfide | 1.5 |
| 2-mercaptobenzothiazole | 0.75 |
| Sulfur | 1.5 |

This compounded stock (referred to below as Stock A) is cured at about 307° F. for 30 minutes.

For purposes of comparison two controls (Stocks B and C) outside the scope of the present invention are made using the general recipe and cured as above except as follows: Stock B is compounded conventionally on a rubber roll mill at 75–100° C., 100 parts of copolymer and 72 parts of HAF carbon black being substituted for the 172 parts of the highly-sheared, black-loaded stock; Stock C contains the highly-sheared, black-loaded stock but the SBR is omitted; the sulfur concentrations in each case (1.5 phr. for for B, 2 phr. for C) are selected to give vulcanizates of optimum quality.

Typical vulcanizate properties at 25° C. are shown in the Table I which follows:

TABLE I

| | A | B* | C* |
|---|---|---|---|
| NBS Abrasion Index | 1,265 | 236 | 362 |
| Tensile at break (p.s.i.) | 3,150 | 3,100 | 3,179 |
| Elongation at break (percent) | 490 | 610 | 430 |
| Modulus at 300% Extension (p.s.i.) | 1,550 | 1,070 | 2,060 |
| Permanent Set at break (percent) | 11 | 15 | 8 |
| Hardness (Shore A) | 60 | 56 | 57 |
| Heat Build-up: | | | |
| External T (° C.) | 133 | 130 | 111 |
| ΔT (° C.) | 62 | 68 | 59 |
| ΔC (mils) | 21 | 18 | 7 |

*Controls outside the scope of the invention.

If the procedure for Stock A is repeated using 0.75 or 2.5 parts of sulfur instead of 1.5 parts, the NBS abrasion index values typically drop to about 554 and 371, respectively.

Example 2

Example 1 is repeated except that 2 parts of SBR are employed in the compounding recipe. The NBS abrasion index value is typically about 1167 and the other physical properties are not materially affected. If the amount of sulfur added is raised to about 2.5 parts, the NBS index value is typically about 403. Use of only 0.75 part of sulfur yields unsatisfactory vulcanizates.

If Example 1 is repeated except that 3 parts of SBR are employed in the compounding recipe, the NBS abrasion index value is typically about 369 and the remaining physical properites are all somewhat lower.

Example 3

Example 1 is repeated except that the 1 part of SBR is replaced by 1 part of natural rubber (smoked sheet). The NBS abrasion index is typically about 1057 with no substantial change in the other properties.

Example 4

Example 1 is repeated using 2 parts of natural rubber instead of 1 part SBR. The NBS abrasion index is typically about 1069 with the modulus about 1000 p.s.i. and the ΔC about 97 mils.

Example 5

Example 1 is repeated using 3 parts of natural rubber and 2.5 parts of sulfur in the compounding recipe. The NBS abrasion index is typically about 686. If this example is repeated with only 1.5 parts of sulfur, the NBS abrasion index is about 491 and there is some drop in the other physical properties.

Other α-olefin hydrocarbon copolymers can be employed by substituting them in equivalent amounts for the EPH copolymer in the above examples.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. A composition curable to an abrasion-resistant vulcanizate which comprises (1) 100 parts of a sulfur-curable copolymer of ethylene, propylene and 1,4-hexadiene containing from 20 to 160 parts of carbon black, which has been highly sheared at a temperature of at least 200° F. sufficient to reduce the Mooney Scorch minimum, measured at 250° F., from about 5 to 20 percent, (2) about 1 to 2 parts of an additive rubber selected from the group consisting of styrene-butadiene rubber, natural rubber, and cis-polyisoprene rubber, and (3) a sulfur curing system in an amount equivalent to the amount of additive rubber.

2. A composition as defined in claim 1 wherein said additive rubber is styrene-butadiene rubber.

3. A composition as defined in claim 1 wherein said additive rubber is natural rubber.

4. The composition of claim 1 subjected to vulcanizing conditions.

References Cited

UNITED STATES PATENTS 2,933,480  4/1960  Gresham et al. ____ 260—80.56
3,224,985  12/1965  Gladding et al. _____ 260—889

MURRAY TILLMAN, *Primary Examiner.*

M. J. TULLY, *Assistant Examiner.*